(12) United States Patent
Neogi (10) Patent No.: US 7,567,670 B2
(45) Date of Patent: Jul. 28, 2009

(54) VERIFICATION INFORMATION FOR DIGITAL VIDEO SIGNAL

(75) Inventor: Raja Neogi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 10/856,008

(22) Filed: May 28, 2004

(65) Prior Publication Data
US 2005/0278733 A1  Dec. 15, 2005

(51) Int. Cl.
*H04K 1/04* (2006.01)
*H04K 1/06* (2006.01)
*H04L 9/00* (2006.01)
*H04N 7/167* (2006.01)
*G06F 7/04* (2006.01)
*G06F 7/58* (2006.01)
*G06F 12/00* (2006.01)
*G06F 12/14* (2006.01)
*G06F 13/00* (2006.01)
*G06F 17/30* (2006.01)
*G06K 19/00* (2006.01)
*G11C 7/00* (2006.01)
*H04L 9/32* (2006.01)

(52) U.S. Cl. .......................... 380/200; 380/37; 380/43; 380/201; 726/21

(58) Field of Classification Search ............... 380/37, 380/43, 201, 200; 726/21
See application file for complete search history.

(56) References Cited

U.S. PATENT DOCUMENTS 6,282,651 B1 *  8/2001  Ashe ........................... 713/193
7,035,470 B2 *  4/2006  Wong et al. ................. 382/233
2001/0036271 A1 * 11/2001  Javed ........................... 380/217
2003/0206174 A1 * 11/2003  MacInnis et al. ............ 345/560
2004/0019783 A1 *  1/2004  Hawkes et al. ............... 713/161
2005/0097052 A1 *  5/2005  Systa et al. .................... 705/51
2006/0165232 A1 *  7/2006  Burazerovic et al. ........... 380/37

OTHER PUBLICATIONS

Microsoft® Computer Dictionary, Fifth Edition Excerpt Pub Date: May 1, 2002.*
Electronics & Communication Engineering Journal, Dec. 1995 MPEG-2 Video Compression by P.N. Tudor http://www.bbc.co.uk/rd/pubs/papers/paper_14/paper_14.shtml.*
Networking Linux®: A Practical Guide to TCP/IP Excerpt by Pat Eyler Pub Date: Mar. 21, 2001.*
Federal Information Processing Standards Publication 180-1 Secure Hash Standard Apr. 17, 1995 http://www.itl.nist.gov/fipspubs/fip180-1.htm.*
IBM WebSphere V4.0 Advanced Edition Security by Peter Kovari; Victoria Amor; Marko Fuchs; Joanna Hodgson; James Roca Pub Date: Mar. 20, 2002 Excerpt: Section 3.1.2 Certificates.*

(Continued)

*Primary Examiner*—Kambiz Zand
*Assistant Examiner*—Benjamin A Kaplan
(74) *Attorney, Agent, or Firm*—Buckley, Maschoff & Talwalkar LLC (57) ABSTRACT

According to some embodiments, verification information is provided for a digital video signal. For example, a digital video signal including a first portion and a second portion may be determined at a video server. Verification information associated with the first portion may be calculated using a verification function and encrypted. The encrypted verification information may then be embedded into the second portion.

21 Claims, 12 Drawing Sheets

OTHER PUBLICATIONS

Computer Networks: A Systems Approach ($3^{rd}$ edition) Authors: Larry L. Peterson, Bruce S. Davie Publication Date: Jun. 2003 Excerpt: pp. 88-91, 580-594 & 600-601.*

SGI ® Standard Template Library Programmer's Guide Copyright ® 1993-2001 http://web.archive.org/web/20010221202044/http://www.sgi.com/tech/stl/HashFunction.html http://web.archive.org/web/20010419100104/www.sgi.com/tech/stl/HashedAssociativeContainer.html http://web.archive.org/web/20010606084828/www.sgi.com/tech/stl/BinaryPredicate.html.*

* cited by examiner

VERIFICATION INFORMATION FOR DIGITAL VIDEO SIGNAL

BACKGROUND

A digital video signal may be transmitted from a video server to a video receiver. For example, a digital video signal might be transmitted from a video server associated with a cable television company to a set-top box associated with a television. The set-top box may process the received video signal and arrange for a moving image to be displayed on the television.

In some cases, however, an original digital video signal may be altered or tampered with using video editing software and/or hardware before the signal reaches the video receiver. By way of example, images or portions of images could be deleted from (or inserted into) a news or sports video image. Moreover, such changes could be difficult or impossible for a viewer to detect.

DETAILED DESCRIPTION

Figure 1:
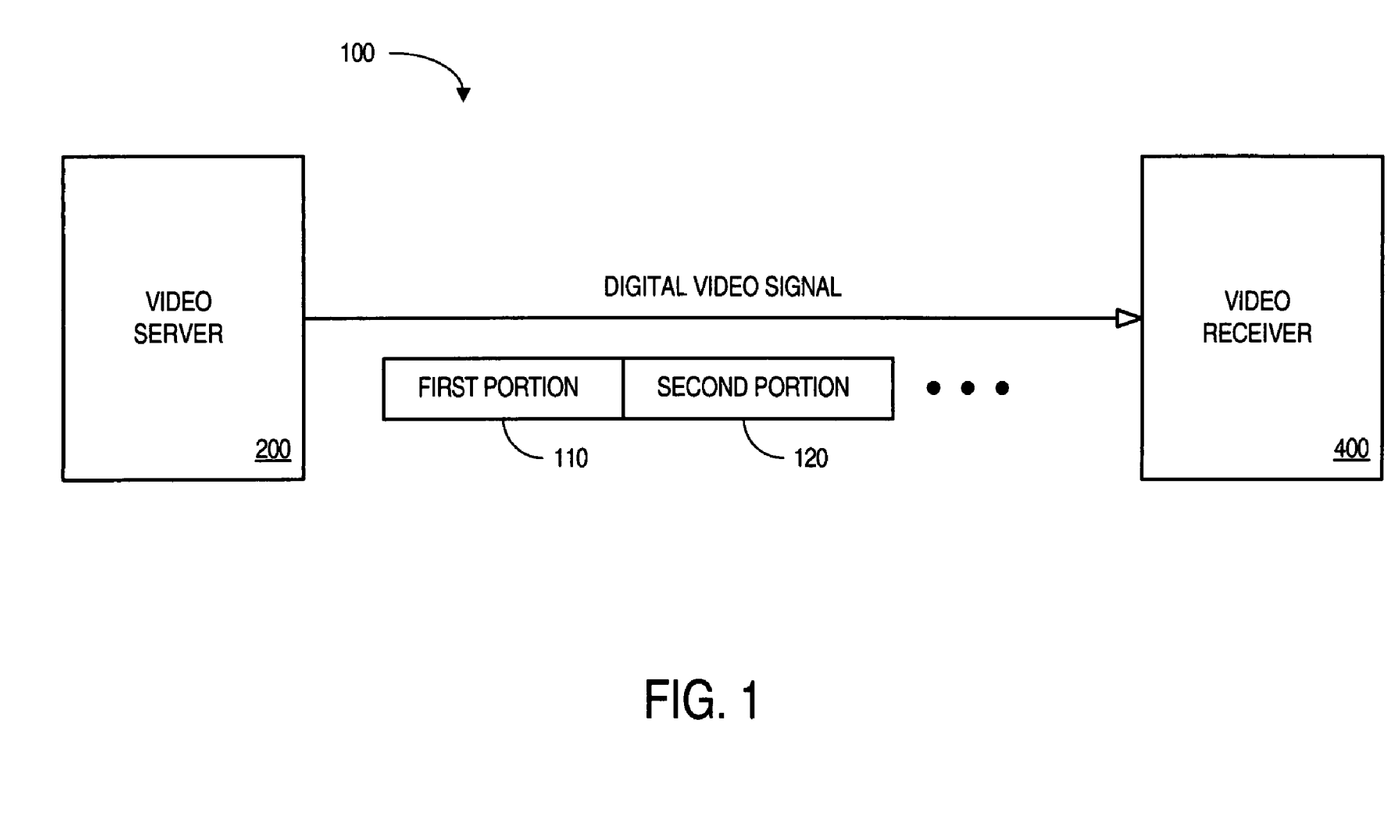
FIG. 1 is a block diagram of a system to provide a digital video signal from a video server to a video receiver according to some embodiments.

A digital video signal may be transmitted from a video server to a video receiver. For example, FIG. 1 is a block diagram of a system 100 to provide a digital video signal from a video server 200 to a video receiver 400 according to some embodiments. The video server 200 may encode and transmit information and may be, for example, a processor associated with a cable or satellite television service or any other type of content provider. The video receiver 400 may receive, decode, and/or display information and may be associated with, for example, a television, a set-top box, a Personal Computer (PC), a portable device, a wireless device, and/or a gaming device.

The digital video signal might be associated with, for example, the Motion Picture Experts Group (MPEG) 1 protocol as defined by International Organization for Standardization (ISO)/International Engineering Consortium (IEC) document number 11172-1 entitled "Information Technology—Coding of Moving Pictures and Associated Audio for Digital Storage Media" (1993). Similarly, the digital video signal may be a Digital Television (DTV) signal, such as a High Definition Television (HDTV) signal formatted in accordance with the MPEG2 protocol as defined by ISO/IEC document number 13818-1 entitled "Information Technology—Generic Coding of Moving Pictures and Associated Audio Information" (2000) or the MPEG4 protocol as defined by ISO/IEC document number 14496-1 entitled "Information Technology—Coding of Audio-Visual Objects" (2001).

The digital video signal may be a stream of information that includes first portions 110 and second portions 120. In the case of MPEG2, for example, the first and second portions 110, 120 may be associated with image frames—with the first portion 110 representing brightness or luminance ("luma") blocks and the second portion 120 representing color or chrominance ("chroma") blocks.

In order to detect whether or not an original digital signal has been altered, a code or "fingerprint" could be periodically inserted into the signal. Such an approach, however, may be unable to detect changes to the signal that occur in between the fingerprints or whether portions of the signal have been re-arranged. Moreover, a standard HDTV receiver may be unable to directly display the received signal (e.g., it might have to remove the fingerprint).

According to some embodiments, the video server 200 calculates verification information associated with the first portion 110 and a verification function. By way of example, the video server 200 might compute a hash value based on a luma block and a hash function. The verification information may then be embedded in the second portion 120 (e.g., in a chroma block). In some embodiments, the verification information may also be encrypted before being embedded into the second portion 120. Note that information may be embedded into the chroma blocks without distorting the final image that is displayed to a viewer to a degree that would be perceptible to a human. As a result, it may be possible to directly process and display the received signal (e.g., without removing the embedded information). Moreover, the bandwidth that is available with such an approach may be several thousand bits per second.

The video receiver 400 may then extract the verification information from the second portion and/or decrypt the verification information. Moreover, the video receiver 400 may locally compute verification information using the first portion 110 and the same verification function that was used by the video server 200. The video receiver 400 may then compare to two values to determine whether or not the original signal was altered before it was received.

Figure 2:
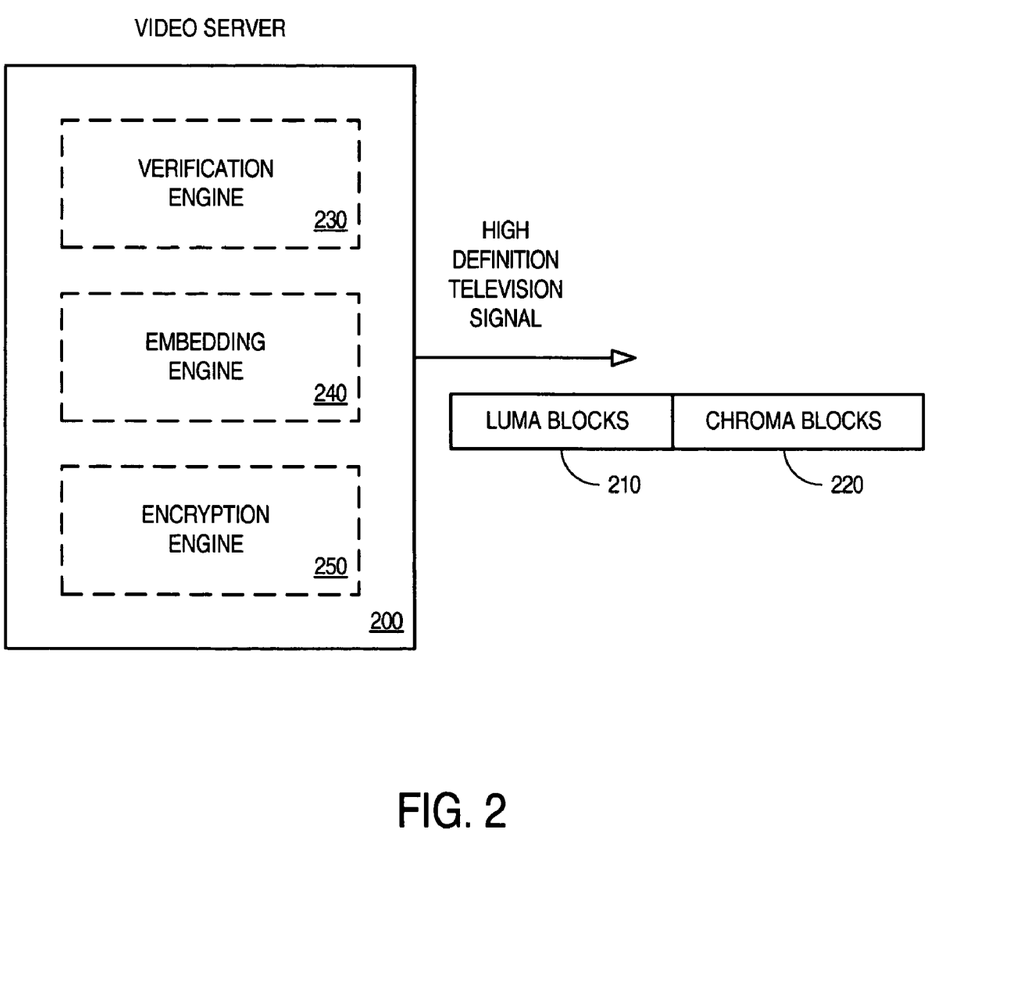
FIG. 2 is a block diagram of a video server according to some embodiments.

FIG. 2 is a block diagram of a video server 200 that transmits an HDTV signal including luma blocks 210 and chroma blocks 220 according to some embodiments. The video server 200 includes a verification engine 230 that calculates verification information associated with a luma block and a verification function (e.g., by executing a hash function). The video server 240 also includes an embedding engine 240 to embed the verification information into a chroma block 220. The signal may then be transmitted to a remote video receiver via an output line. According to some embodiments, an encryption engine 250 encrypts the verification information before it is embedded.

Figure 3:
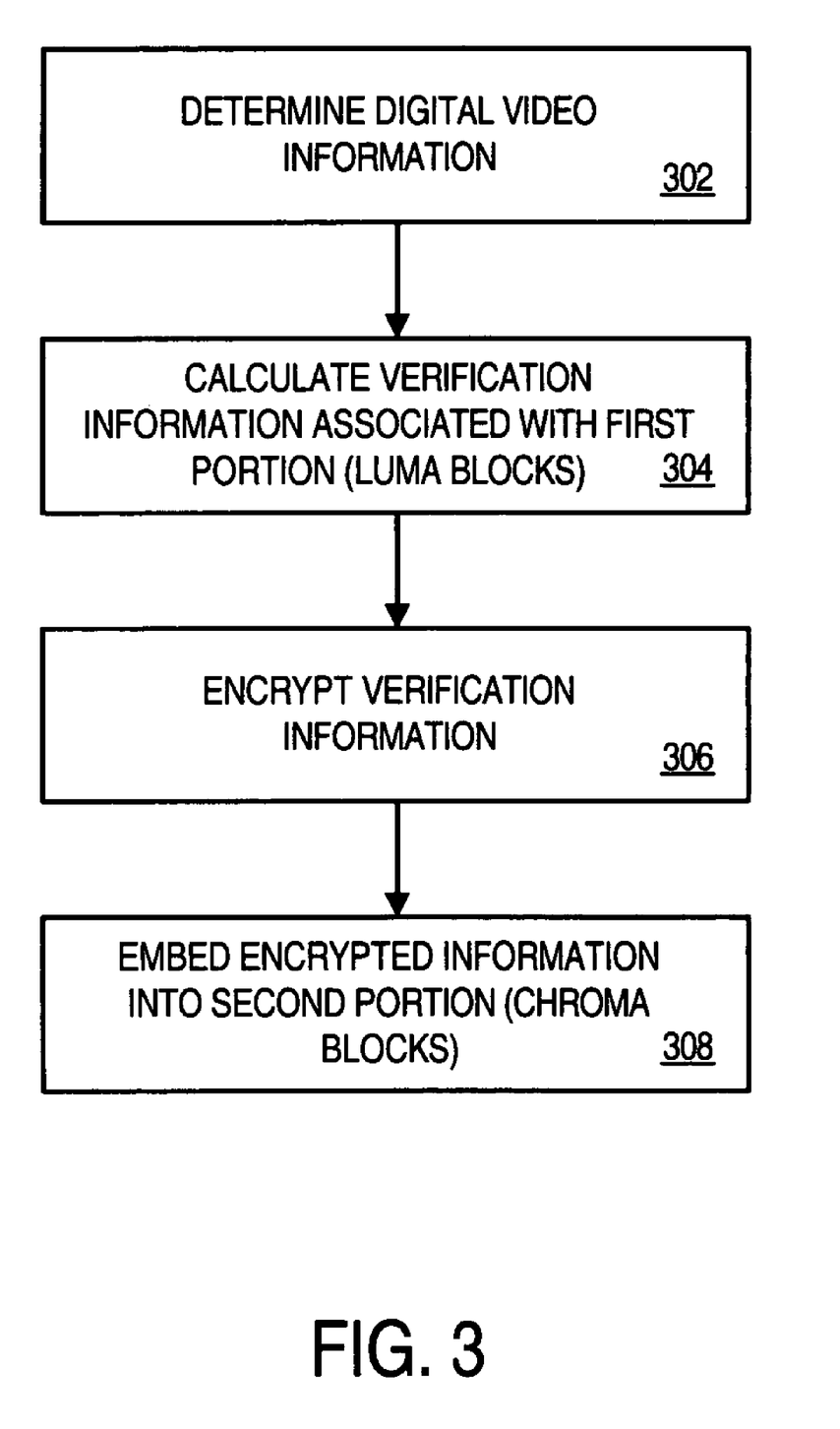
FIG. 3 is a flow chart of a video server method according to some embodiments.

FIG. 3 is a flow chart of a video server method according to some embodiments. The method may be performed, for example, by an apparatus that processes and/or transmits a digital video signal (such as the video server 200 described with respect to FIGS. 1 and 2). The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 302, a digital video signal is determined. For example, a video server 200 might retrieve and/or process a signal from a storage device (e.g., a hard disk drive) or from a remote device (e.g., a satellite). The digital video signal includes a first portion (e.g., a luma block) and a second portion (e.g., a chroma block).

At 304, verification information associated with the first portion and a verification function is calculated. By way of example, a video server 200 might execute a hash function to calculate a hash value associated with a luma block. At 306, the verification information in encrypted. According to some embodiments, a video server 200 might encrypt the verification information using a public encryption key, a private encryption key, and/or asymmetric key management.

At 308, the encrypted verification information is embedded into the second portion (e.g., a chroma block). The video server may then transmit the HDTV signal (e.g., including the information that was embedded into the second portion) to a remote video receiver 400 via a network or channel.

Figure 4:
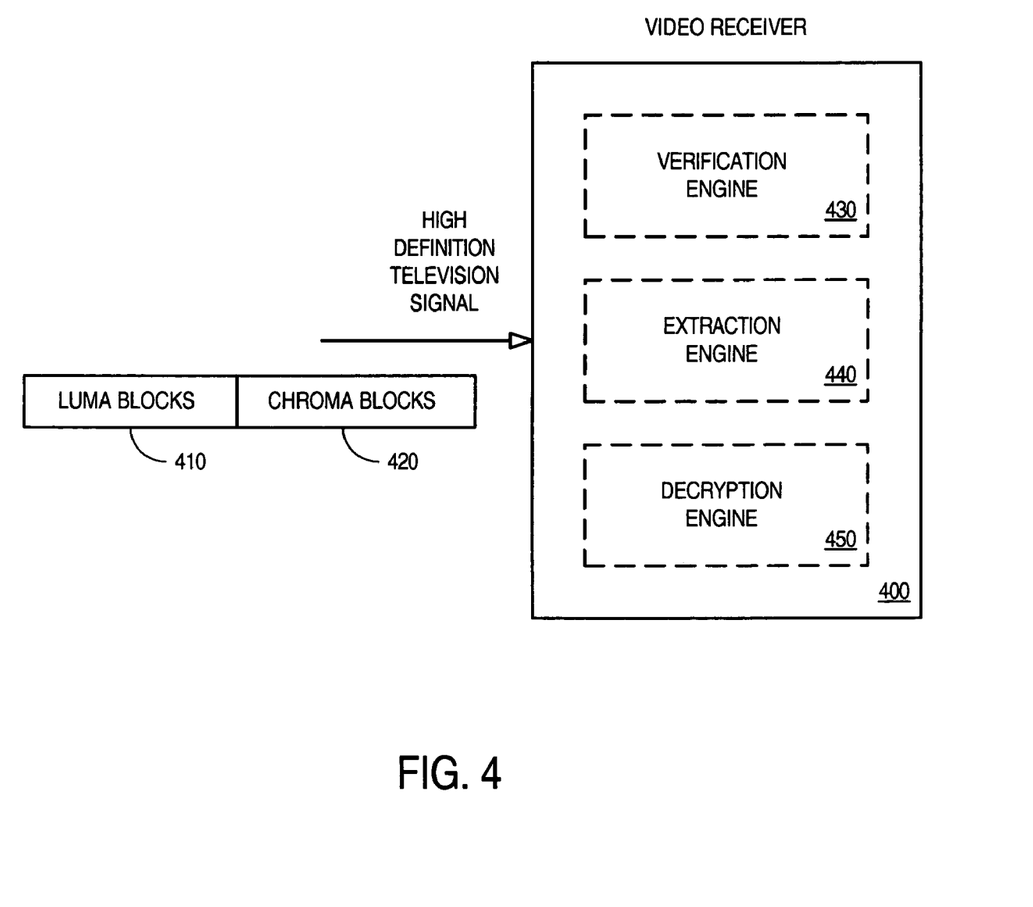
FIG. 4 is a block diagram of a video receiver according to some embodiments.

FIG. 4 is a block diagram of a video receiver 400 according to some embodiments. The video receiver 400 has an input line to receive an HDTV signal that includes a luma block 410 and a chroma block 420. A verification engine 430 locally calculates a first verification value based on a received luma block 410 and a verification function (e.g., a hash function).

An extraction engine 440 extracts information from a received chroma block 420, and a decryption engine 450 decrypts the extracted information to generate a second verification value (e.g., the value that was computed by a video server 200 based on the original luma block 410 and embedded into the chroma block 420). The first and second verification values can then be compared to see if the original HDTV signal has been altered. That is, if someone attempts to alter any of the luma block information or chroma block information, the first and second values will no longer match.

Figure 5:
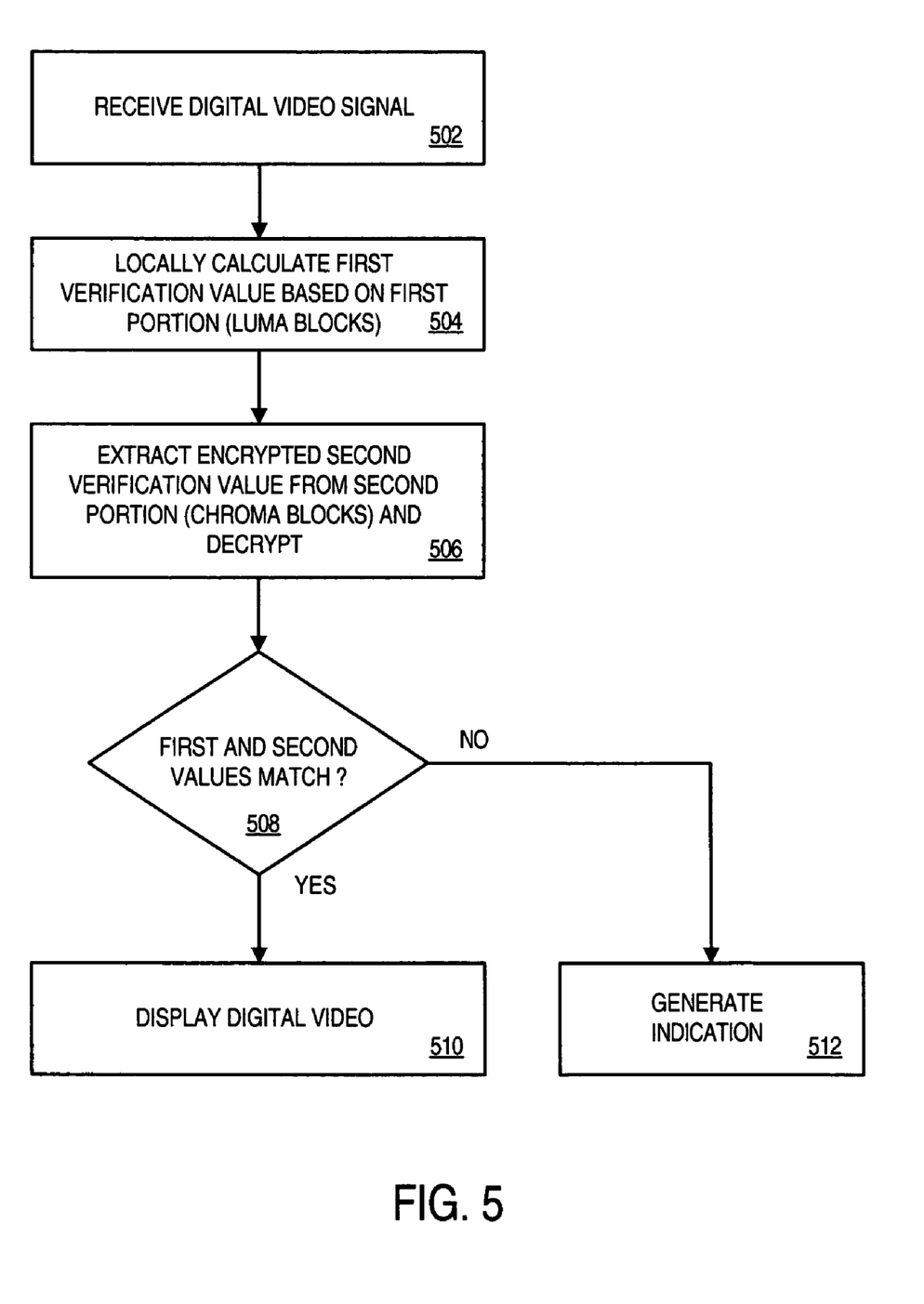
FIG. 5 is a flow chart of a video receiver method according to some embodiments.

FIG. 5 is a flow chart of a video receiver method according to some embodiments. At 502, a digital video signal is received, including a first portion and a second portion, and, a first verification value is locally calculated based on the first portion (e.g., a luma block) at 504.

At 506, an encrypted second verification value is extracted from the second portion (e.g., a chroma block) and is decrypted. The information may be decrypted, for example, using a public key, a private key, and/or asymmetric key management. If the first and second values match at 508, the digital video signal has not been altered and may be displayed at 510.

If the first and second values do not match at 508, the video signal has been tampered with and an indication is generated at 512. For example, the indication might be to display a blank screen to a viewer. As another example, a text or audio warning might be displayed in addition to the altered image. As still another example, a signal or message might be transmitted to a remote device (e.g., to the video server 200, a television network, or a cable television company).

Figure 6:
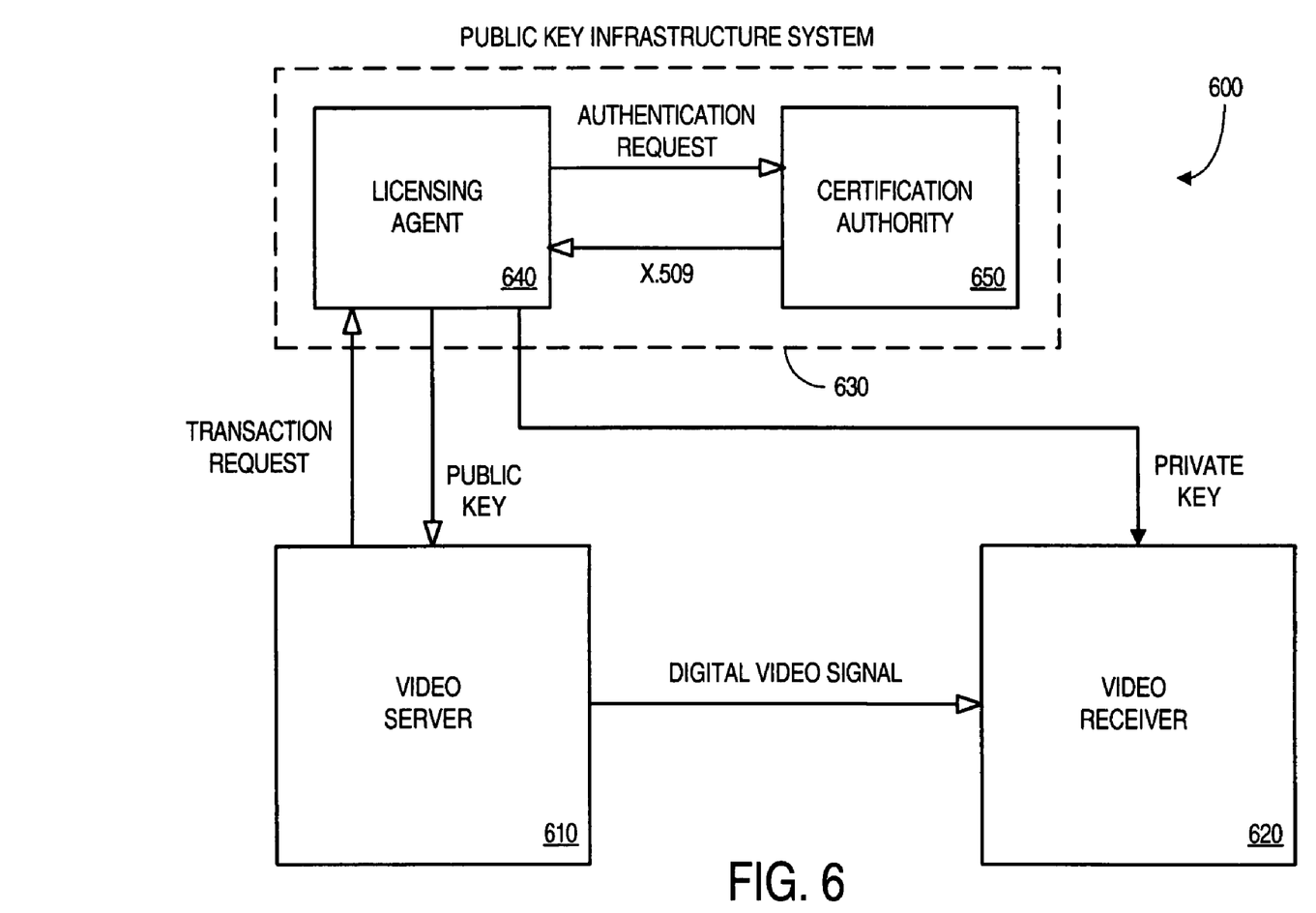
FIG. 6 is block diagram of a system to provide a digital video signal according to some embodiments.

Note that the information embedded into the second portion may be encrypted. FIG. 6 is block diagram of a system 600 to provide a digital video signal according to one such embodiment. In this case, a video server 610 exchanges information with a licensing agent 640 associated with a Public Key Infrastructure (PKI) system 630. In particular, the video server 610 may transmit a transaction request to the licensing agent 640. In response to the request, the licensing agent 640 sends an authentication request to a certification authority 650 to verify the identity of the video server 610. The certification authority 650 may respond, for example, by issuing an X.509 certificate as described in the Internet Engineering Task Force (IETF) Request For Comment (RFC) 3280 (1988).

The licensing agent 640 then generates a key pair, providing the public key to the video server 610 and the private key to a video receiver 620. The private key might be provided, for example, out-of-band and/or using a password or Personal Identification Number (PIN). According to some embodiments, the licensing agent 640 transmits the private key to the video server 610 which then forwards it to the video receiver 620.

The video server 610 may then use the public key to encrypt information before it is embedded in the second portion, and the video receiver 620 may use the private key to decrypt the information after it is extracted from the second portion.

Figure 7:
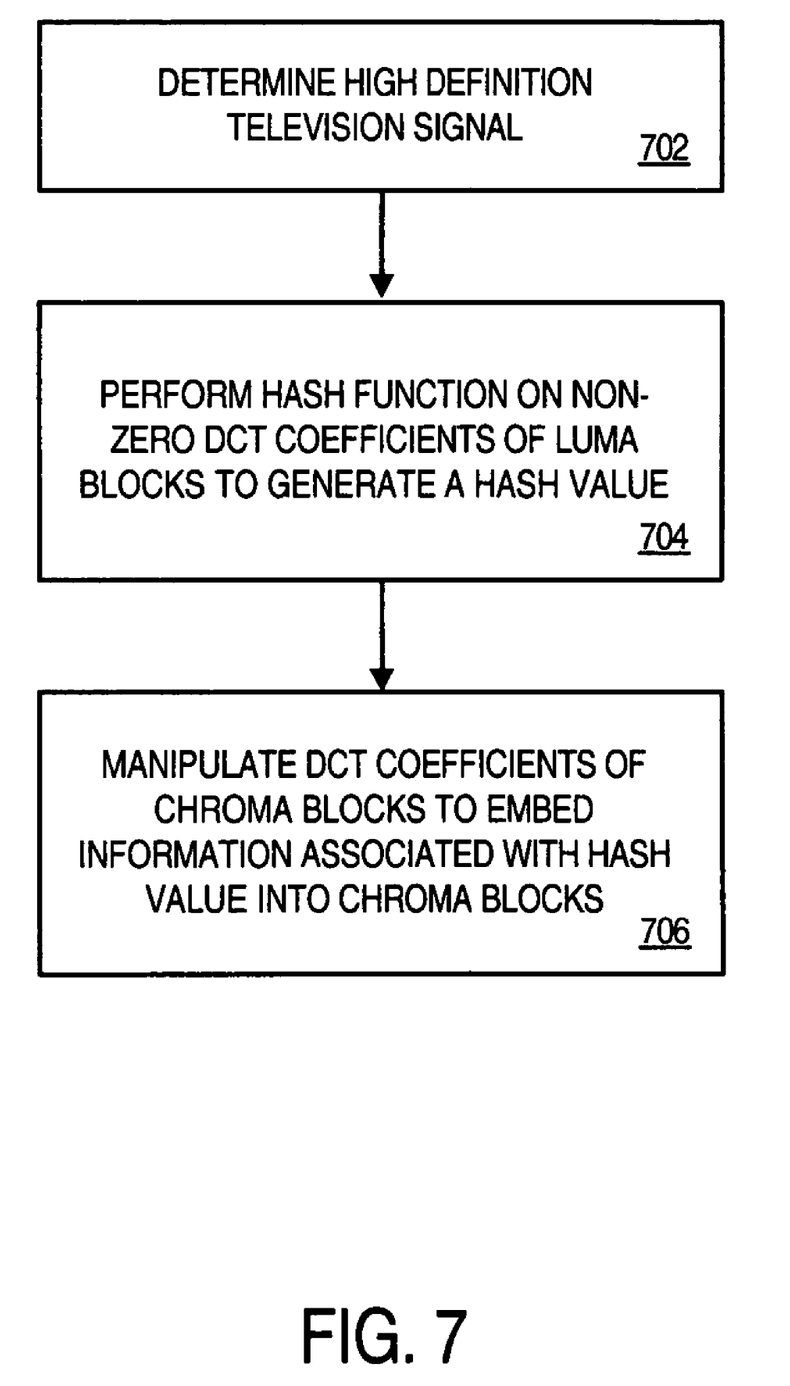
FIG. 7 is flow chart of a method of embedding verification information into chroma blocks according to some embodiments.

FIG. 7 is flow chart of a method of embedding verification information into chroma blocks according to some embodiments. At 702, an HDTV signal is determined (e.g., by retrieving, receiving, and/or processing an image signal).

The HDTV signal will include luma blocks and chroma blocks. Moreover, in accordance with standard HDTV signal processing, the information will represent Discrete Cosine Transformation (DCT) coefficients for the blocks (e.g., representing an amount of spectral power is present at each spatial frequency). Note that the coefficients may be quantized (e.g., to eliminate less important DCT coefficients). At 704, the video server performs a hash function on the non-zero DCT coefficients of a luma block to generate a hash value. The hash function may, for example, transform the string of coefficients into a shorter, fixed-length value. By way of example, the hash function might generate a Message Digest (MD) in accordance with the MD5 algorithm defined in the IETF RFC 1321.

At 706, the DCT coefficients of the chroma blocks are manipulated to embed information associated with the hash value into a chroma block. For example, an encrypted representation of the hash value might be embedded. According to some embodiments, other information is also encrypted and embedded into the chroma block. For example, information about the hash function itself could be embedded into the chroma block (e.g., to be extracted and used by the video receiver). As another example, a frame number associated with the digital video signal may be encrypted and embedded into the chroma block. The HDTV signal may then be transmitted to a remote video receiver.

Figure 8:
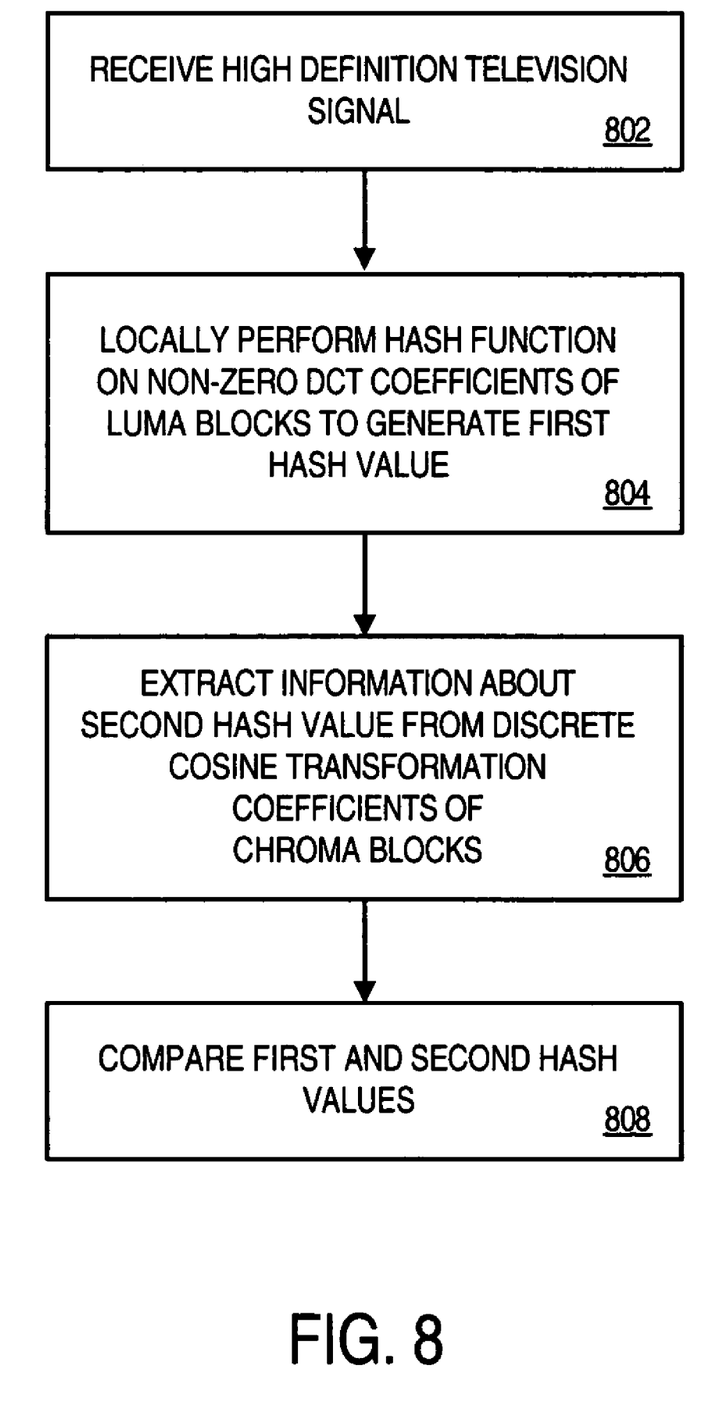
FIG. 8 is flow chart of a method of extracting verification information from chroma blocks according to some embodiments.

FIG. 8 is flow chart of a method of extracting verification information from chroma blocks according to some embodiments. At 802, an HDTV signal including luma blocks and chroma blocks are received. At 804, the video receiver locally performs a hash function on the non-zero DCT coefficients of a luma block to generate a first hash value.

At 806, the video receiver extracts a second hash value from the DCT coefficients of a chroma block (e.g., the chroma block associated with that luma block). The video receiver then compares the two hash values at 808 to determine whether or not the original HDTV signal has been altered.

According to some embodiments, if the two hash values do not match the video receiver prevents the image from being displayed to a viewer.

Figure 9:
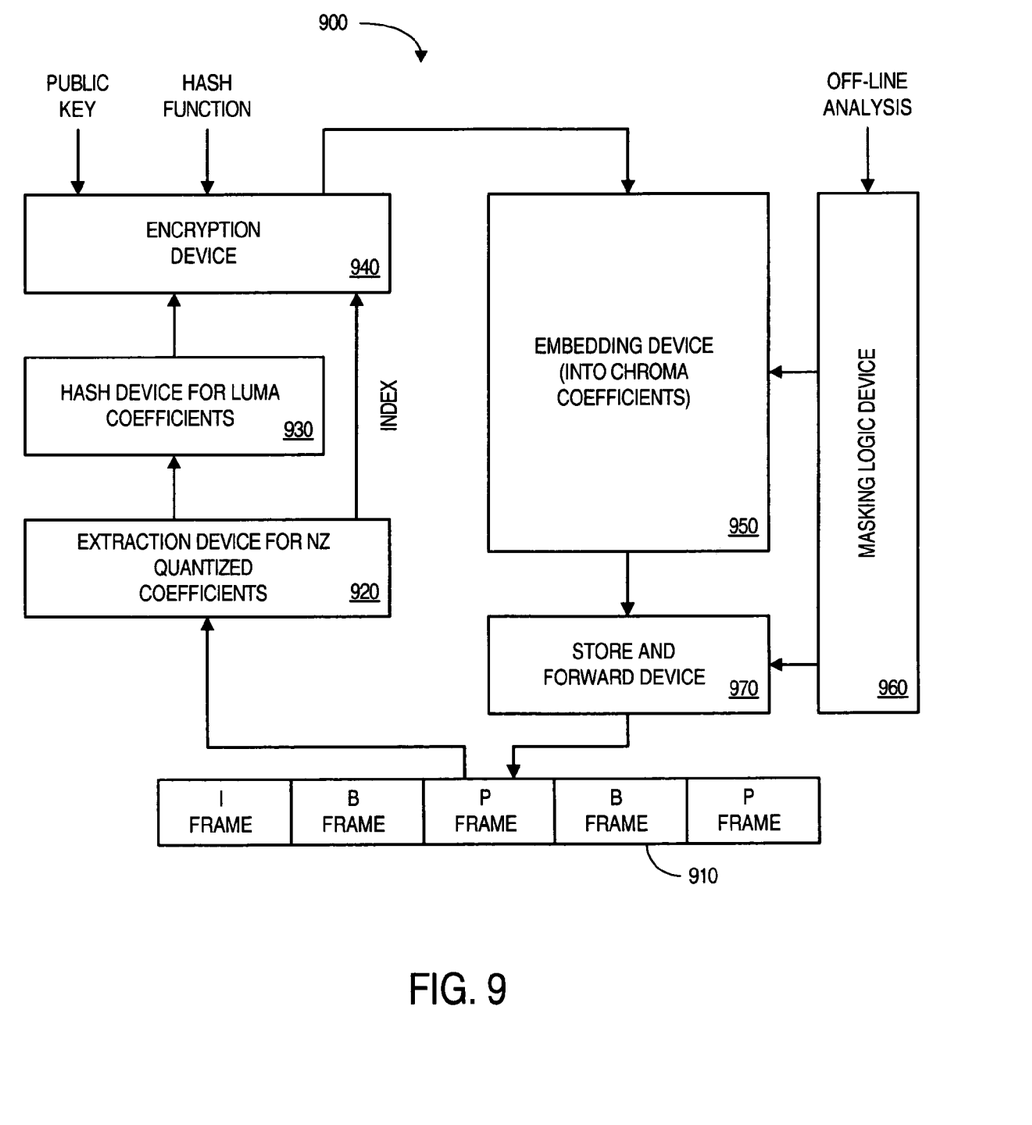
FIG. 9 is a block diagram of an example of a video server according to one embodiment.

FIG. 9 is a block diagram of an example of a video server 900 according to one embodiment. The video server 900 receives a stream 910 of HDTV frames, including Intracoded (I) frames which represent self-contained still pictures. The stream 910 also includes Predictive (P) frames, which represent block-by-block difference with the previous frame, and Bi-directional (B) frames, which represent differences between the previous frame and the next frame.

As illustrated in FIG. 9, an extraction device 920 may extract non-zero quantized coefficients from a frame. The extraction device 920 provides an index number associated with that frame to an encryption device 940 and the luma coefficients to a hash device 930.

The hash device 930 calculates a hash value in accordance with a hash function and provides the hash value to the encryption device 940. Note that the hash value might be computed in a number of different ways. For example, the variance of DCT coefficients in an 8×8 pixel neighborhood might be calculated to create a variance array. A local minima of the variance array may then be calculated in the 8×8 pixel neighborhood, with the minimum value being replaced with a "1" and all other values being replaced with a "0." The sting of "1 s" and "0s" could then be run-length coded to generate a fixed-size hash value.

The encryption device 940 creates a message that includes the hash value, the frame index number, and information about the hash function itself (e.g., when a number of different hash functions might be used). This message is then encrypted using a public key and provided to an embedding device 950.

The embedding device 950 manipulates bits in the chroma block's DCT coefficients in order to embed the encrypted message. Note that this may be done in a number of different ways. Consider, for example, a given DCT coefficient $D(i, j)$ having a quantization factor of $Q(i, j)$. In this case, $Q(i, j)$ might be divided by two and $D(i, j)$ might be multiplied by two without impacting the visual appearance of the video image. Since all of the $D(i, j)$ coefficients would now be even values, the Least Significant Bits (LSBs) can be used to store the binary message. After the message is embedded, the frame may be transmitted to a remote video receiver and the next frame in the stream 910 may be processed.

A masking logic device 960 may be used to protect certain sensitive frequency bands associated with the image signal (e.g., as determined by an off-line analysis). Moreover, when store and forward is enabled, a store and forward device 970 may be used (e.g., when embedding is allowed only for the closest B frames). This approach might be useful, for example, when it is necessary to suppress chroma distortion. Note that since no other frames are dependant on B frames, any such distortion may not be propagated. In this mode, encrypted messages may be stored until they can be embedded.

Figure 10:
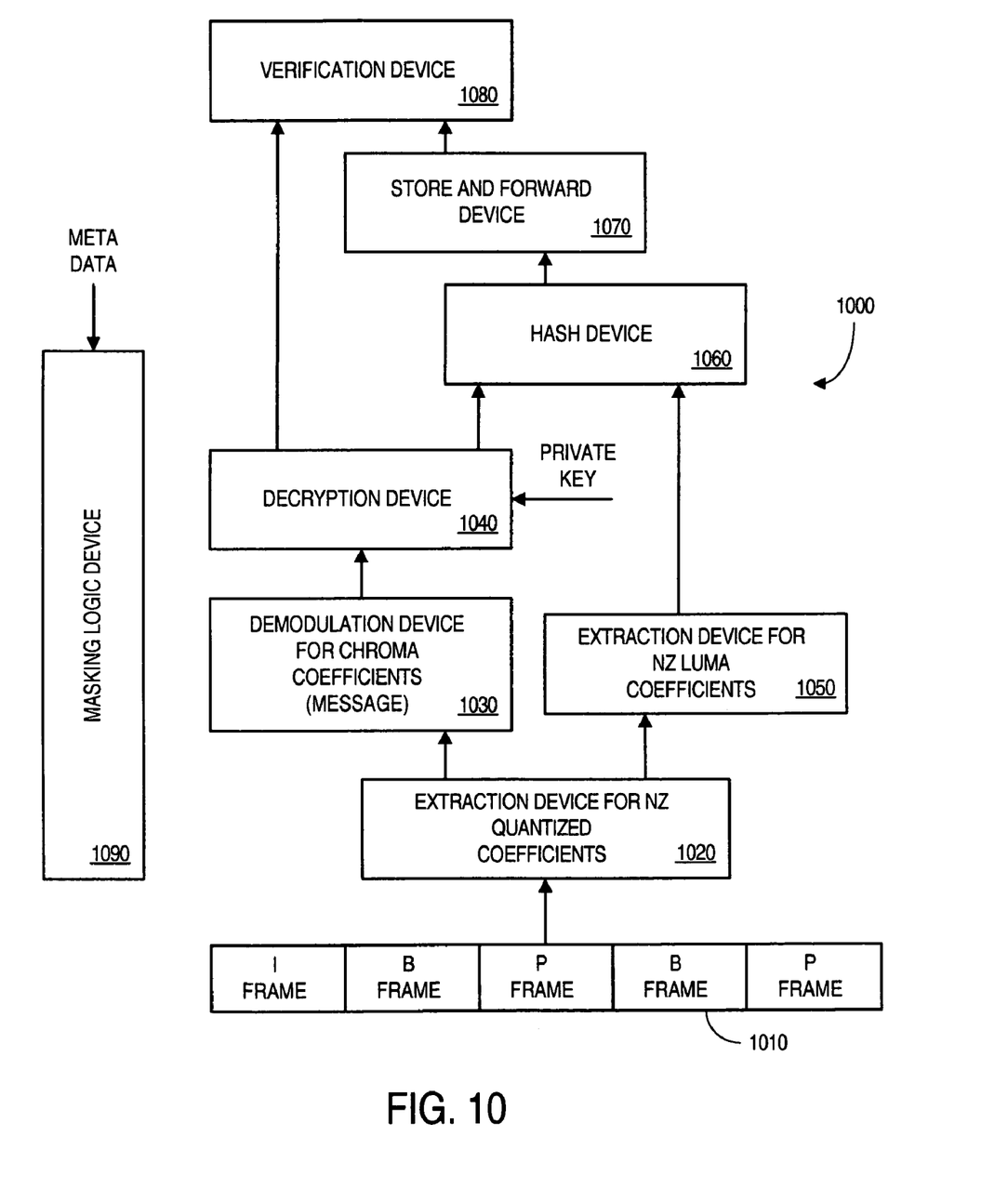
FIG. 10 is a block diagram of an example of a video receiver according to one embodiment.

FIG. 10 is a block diagram of an example of a video receiver 1000 according to one embodiment. The video receiver 1000 receives from a remote video server a stream 1010 of HDTV frames, including I, B, and/or P frames. An extraction device 1020 extracts the non-zero DCT quantized coefficients and provides the chroma coefficients to a demodulation device 1030. The demodulation device 1030 extracts the embedded, encrypted message from the chroma coefficients (e.g., by using the appropriate LSBs) and provides the encrypted message to a decryption device 1040. The encryption device 1040 decrypts the message using a private key and transmits the hash value to a verification device 1080 and transmits information about the hash function to a hash device 1060.

The hash device 1060 also receives non-zero luma coefficients from an extraction device 1050 and performs the hash function. This hash value is also provided to the verification device 1080 (e.g., perhaps through a store and forward device 1070 as described with respect to FIG. 9). The verification device 1080 may then compare the received hash value with the locally computed hash value. Note that according to some embodiments, a masking logic device 1090 may be used to protect certain sensitive frequency bands associated with the image signal (e.g., as determined by meta data associated with the stream 1010).

Figure 11:
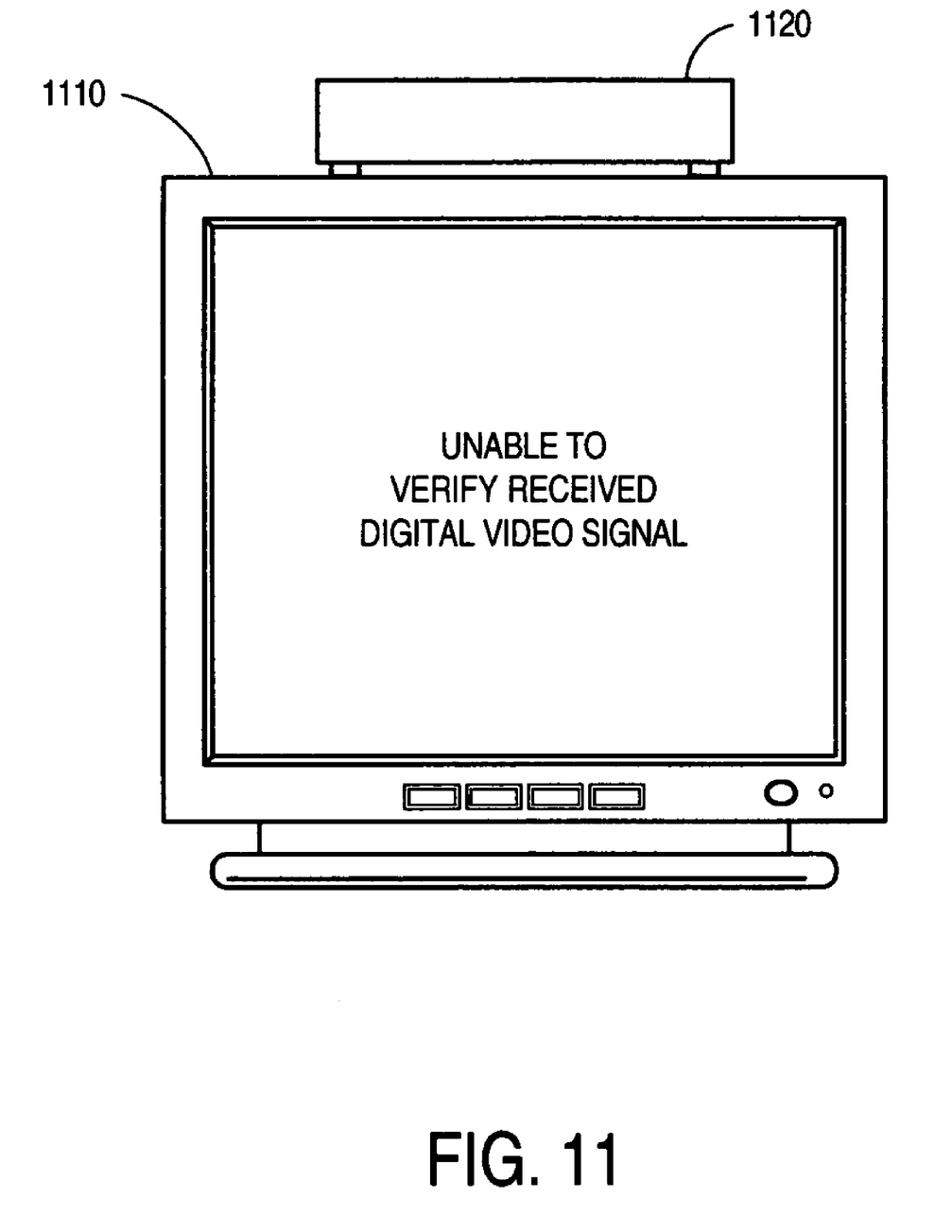
FIG. 11 illustrates an indication according to some embodiments.

If the received hash value matches the locally computed hash value, the video receiver 1000 may arrange for the image to be displayed. If the received hash value does not match the locally computed hash value, the video receiver 1000 may arrange for an indication to be provided (e.g., to a viewer). For example, FIG. 11 illustrates an indication according to some embodiments. In this case, a set-top box 1120 (e.g., including the video receiver 1000), displays an error message to a viewer via a television 1110. Note that the message may be displayed superimposed on the altered image or the altered imaged may be suppressed.

Figure 12:
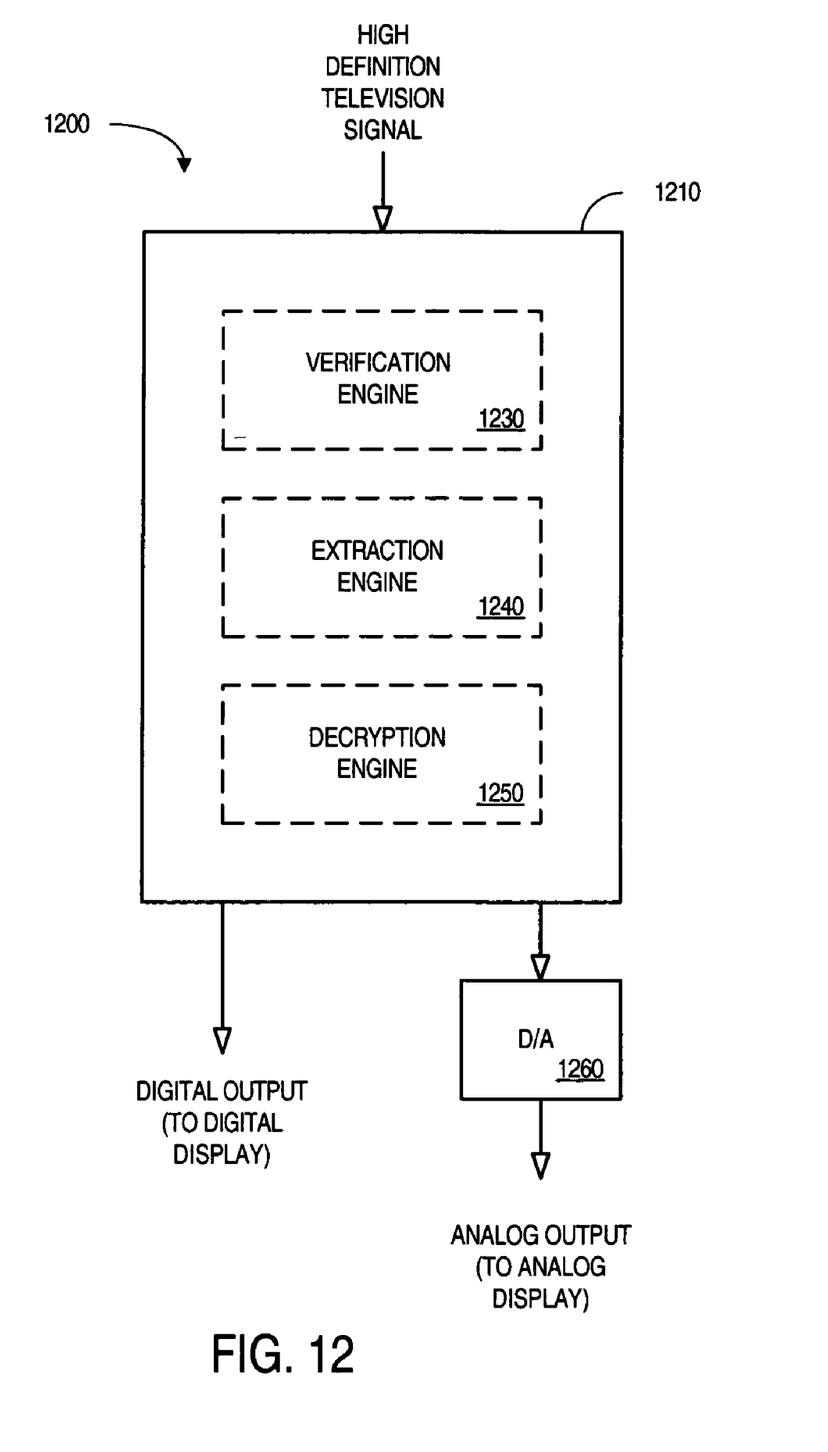
FIG. 12 is a block diagram of video receiver system according to some embodiments.

FIG. 12 is a block diagram of video receiver system 1200 according to some embodiments. The system 1200 might be associated with, for example, a television, a set-top box, a PC, a portable display device, a wireless display device, and/or a gaming device.

A video receiver 1210 receives an HDTV signal from a remote video server. The video receiver 1210 may operate in accordance with any of the embodiments described herein. For example, the video receiver 1210 might include: (i) an extraction engine 1240 to extract an encrypted second verification value from a second portion, (ii) a decryption engine 1250 to decrypt the second verification value, and/or (iii) a verification engine 1230 to (a) locally calculate a first verification value associated with the first portion of the received digital video signal and a verification function and (b) compare the first and second verification values.

The system 1200 may also include a digital output to provide a digital output signal (e.g., to a digital television). Moreover, according to some embodiments, the system 1200 also includes a Digital-to-Analog (D/A) converter 1260 to provide an analog output signal. The analog signal might be provided to, for example, an analog television or a Video Cassette Recorder (VCR) device.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although particular hashing and embedding techniques have been described herein as examples, any type of verification function and/or embedding technique might be used instead. Moreover, although some embodiments have been described with respect to a stream of digital video information, embodiments might also be used with stored video information, such as information stored on a Digital Video Disc (DVD) or at a video on-demand device.

The several embodiments described herein are solely for the purpose of illustration. Persons skilled in the art will recognize from this description other embodiments may be practiced with modifications and alterations limited only by the claims.

What is claimed is:

1. A method, comprising:
   determining at a video server a digital video signal including a first portion representing a luma block of the digital video signal and a second portion representing a chroma block of the digital video signal;
   calculating verification information associated with the first portion and a verification function, wherein the verification information is a hash value, and wherein the verification function is a hash function;
   encrypting the verification information;
   embedding the encrypted verification information and information about the verification function into the second portion, wherein the information about the verification function determines the hash function when a number of different hash functions are used; and
   transmitting to a remote video receiver the digital video signal, including (i) the first portion and (ii) the second portion with the embedded encrypted verification information and information about the verification function.

2. The method of claim 1, wherein the digital video signal is a high definition television signal.

3. The method of claim 1, wherein said calculating comprises:
   performing the hash function on non-zero discrete cosine transformation coefficients of the luma block to generate the hash value.

4. The method of claim 3, wherein the hash function is associated with a local minima of a variance array representing discrete cosine transformation coefficients in a pixel block.

5. The method of claim 1, wherein said embedding comprises:
   manipulating discrete cosine transformation coefficients of the chroma block.

6. The method of claim 5, wherein said manipulating further includes masking logic associated with sensitive frequency bands of the digital video signal.

7. The method of claim 1, wherein said encrypting is performed using a key.

8. The method of claim 7, wherein the key is a public key associated with an asymmetric key pair and further comprising:
   receiving the public key from a public key infrastructure server.

9. The method of claim 1, wherein a frame number is further embedded into the second portion of the digital video signal.

10. An article, comprising:
    a storage medium having stored thereon instructions that when executed by a machine result in the following:
    determining at a video server a digital video signal including a first portion representing a luma block of the digital video signal and a second portion representing a chroma block of the digital video signal;
    calculating verification information associated with the first portion and a verification function, wherein the verification information is a hash value, and wherein the verification function is a hash function;
    encrypting the verification information;
    embedding the encrypted verification information and information about the verification function into the second portion, wherein the information about the verification function determines the hash function when a number of different hash functions are used; and
    transmitting to a remote video receiver the digital video signal, including (i) the first portion and (ii) the second portion with the embedded encrypted verification information and information about the verification function.

11. The article of claim 10, wherein the digital video signal is a high definition television signal.

12. The article of claim 10, wherein said calculating comprises:
    performing the hash function on non-zero discrete cosine transformation coefficients of the luma block to generate the hash value.

13. A method, comprising:
    determining at a video server a high definition television signal including a luma block and a chroma block;
    performing a hash function on non-zero discrete cosine transformation coefficients of the luma block to generate a hash value;
    manipulating discrete cosine transformation coefficients of the chroma block to embed information associated with the hash value and the hash function into the chroma block, wherein the information associated with the hash function determines the hash function when a number of different hash functions are used; and
    transmitting to a remote video receiver the high definition television signal, including (i) the luma block and (ii) the chroma block with the embedded information associated with the hash value and the hash function.

14. A method, comprising:
    receiving at a video receiver a digital video signal including a first portion representing a luma block of the digital video signal and a second portion representing a chroma block of the digital video signal;
    locally calculating a first verification value based on the first portion and a verification function, wherein the verification function is a hash function;
    extracting an encrypted second verification value from the second portion and information associated with a hash function that created the second verification value, wherein the information associated with the hash function determines the hash function when a number of different hash functions are used;
    decrypting the second verification value;
    comparing the first and second verification values based at least partially on the hash function that created the second hash value to produce comparison results;
    determining if the digital video signal has been altered based on the comparison results; and
    generating an indication if a determination is made that the digital video signal was altered.

15. The method of claim 14, further comprising:
    if the first verification value matches the second verification value, arranging for the received digital video signal to be displayed; and
    if the first verification value does not match the second verification value, performing an action.

16. The method of claim 15, wherein the action is preventing a display of the received digital video signal.

17. The method of claim 14, wherein said decrypting is performed using a key.

18. The method of claim 17, wherein the key is a private key associated with an asymmetric key pair and further comprising:
    receiving the private key from a public key infrastructure server.

19. A method, comprising:

receiving at a video receiver a high definition television signal including a luma block and a chroma block;

locally performing a hash function on non-zero discrete cosine transformation coefficients of the luma block to generate a first hash value;

extracting information about a second hash value and a hash function that created the second hash value from discrete cosine transformation coefficients of the chroma block, wherein the information associated with the hash function determines the hash function when a number of different hash functions are used;

comparing the first and second hash values based at least partially on the hash function that created the second hash value to produce comparison results;

determining if the high definition signal has been altered based on the comparison results; and generating an indication if a determination is made that the digital video signal was altered.

20. The method of claim 19, further comprising:

performing an action if the first hash value does not match the second hash value.

21. The method of claim 20, wherein the action is associated with at least one of: (i) preventing a display of the received digital video signal, (ii) providing an indication to a user associated with the digital video receiver, and (iii) providing an indication to a remote device.

* * * * *